Patented July 20, 1948

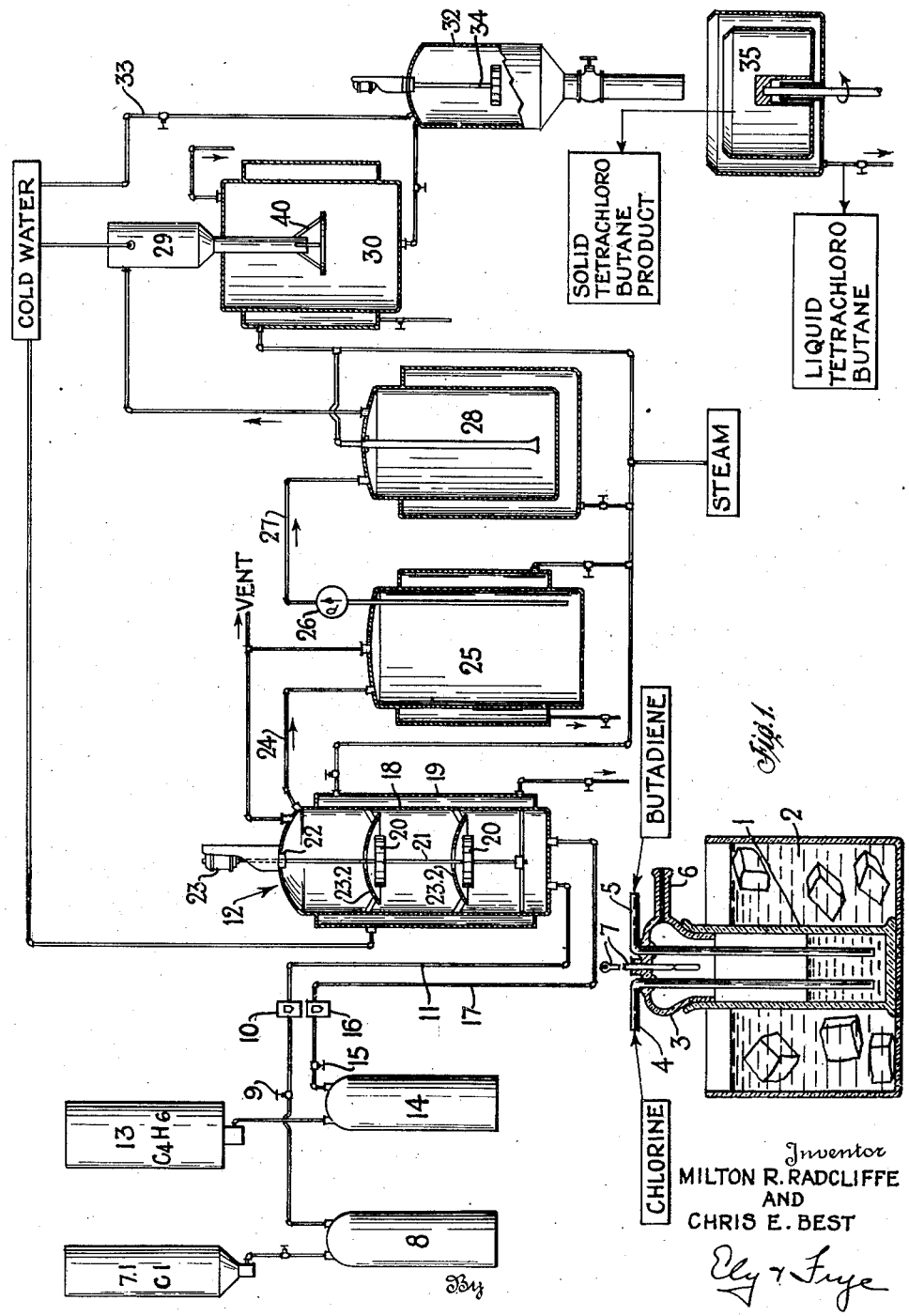

2,445,729

UNITED STATES PATENT OFFICE 2,445,729

PREPARATION OF SOLID TETRA-CHLOROBUTANE

Milton R. Radcliffe, Glen Rock, and Chris E. Best, Montclair, N. J., assignors to The Firestone Tire & Rubber Company, Akron, Ohio, a corporation of Ohio Application December 13, 1944, Serial No. 568,056

3 Claims. (Cl. 260—660)

This invention relates to a process for synthesizing the solid modification of 1,2,3,4-tetrachlorobutane.

1,2,3,4-tetrachlorobutane (hereinafter designated "tetrachlorobutane") contains two symmetrically-disposed unsymmetrical carbon atoms (positions 2 and 3) and therefore occurs as a meso-modification and as an unresolved dl-mixture. One of these modifications (hereinafter designated the solid modification) melts at about 72° C. while the other (hereinafter designated the liquid modification) freezes at relatively low temperatures. The solid modification is the more desirable one, since it may readily be purified by recrystallization. Further, the solid modification, upon dehydrohalogenation by means of caustic, gives much higher yields of 2,3-dichlorobutadiene than does the liquid modification.

Butadiene and chlorine combine readily and smoothly to yield the several forms of tetrachlorobutane. However, unless the reaction is conducted at extremely low temperatures, the products consist largely of the liquid modification. Such low-temperature operation is highly disadvantageous due to the necessity for refrigeration of the exothermic reaction, and also due to manipulative difficulties occasioned by freezing of the solid tetrachlorobutane formed.

Accordingly it is an object of this invention to provide a process for the chlorination of butadiene which will yield predominantly the solid modification of tetrachlorobutane.

Another object is to provide such a process which can be carried out at normal or somewhat elevated temperatures.

Yet another object is to provide such a process which may be carried out in relatively simple equipment and which will be free of manipulative difficulties.

A still further object is to provide such a process which will give high yields of tetrachlorobutane free from difficulty removable by-products.

It has been discovered by this invention that, if chlorine and butadiene are reacted together in the presence of a liquid chlorination medium and of a catalyst selected from the group consisting of antimony pentachloride and ferric chloride, there are obtained excellent yields of tetrachlorobutane predominantly consisting of the solid modification thereof. The reaction proceeds smoothly and rapidly and may be carried out at temperatures sufficiently high to avoid the freezing of the solid modification.

The physical manipulation of contacting the butadiene, chlorine, liquid chlorination medium and catalyst in the process of this invention may be effected according to a wide variety of procedures and by the use of various type of apparatus. As noted above, the reaction must be carried out in contact with a liquid chlorination medium, which may conveniently consist of the chlorination products formed during previous operation. In such cases, the temperature of the reaction mixture must be maintained sufficiently high to prevent choking up of the apparatus with frozen tetrachlorobutane. Alternatively the chlorination medium may contain greater or less quantities of any usual chlorination solvent, such as carbon tetrachloride, chloroform, ethylene dichloride, or the like, in which case the reaction may be conducted at somewhat lower temperatures. The preferred mode of execution consists in introducing separate streams of gaseous chlorine and of butadiene at the bottom of a column of a suitable liquid chlorination medium containing the catalyst. Agitators or other means are preferably provided to commingle and break up the streams of gases as they rise through the column. Alternatively the chlorine and butadiene may be passed up through a scrubbing tower countercurrent to a stream of liquid reaction medium containing the catalyst. In either case, the butadiene and chlorine combine to form tetrachlorobutane, which mingles with the reaction medium and increases the volume thereof. If it is desired to operate continuously, portions of the chlorination medium may be diverted from time to time, and processed to recover the solid tetrachlorobutane. Otherwise, the reaction is continued until the quantity of chlorination medium becomes conveniently large; the reaction is then discontinued, and the chlorination medium processed to recover the product.

The antimony pentachloride and ferric chloride catalysts may be supplied to the chlorination medium in the form of any substances which will yield the required chlorides under the conditions of reaction. Thus the antimony pentachloride may be supplied as such, or in the form of some material which will yield antimony pentachloride under the reaction conditions, such as powdered, flaked or other form of metallic antimony presenting a large surface area; antimony trichloride; antimony oxychloride; and the like. Correspondingly, the ferric chloride may be supplied as such, or in the form of a material which will yield ferric chloride under the conditions of the reaction, such as metallic iron, preferably in finely divided form; ferrous chloride; iron oxides and hydroxides; and the like. In some cases, where the reaction is conducted in vessels of iron or steel, a greater or less proportion of the catalyst may be furnished by the corrosion of the metal, especially if the reactants are not too rigorously freed from water. Mixtures of any of the catalysts above indicated as suitable may also be employed. As noted above, the reaction products dilute the reaction medium, and sufficient catalyst must be supplied at the outset, and if necessary, by subsequent further addition, to maintain the catalyst concentration at the desired value throughout the process. When the process is carried out continuously, supplemental addition of catalyst must, of course, be practiced.

The amount of catalyst to be maintained in the reaction mixture may vary widely; as little as 0.1% of catalyst, based on the weight of the reaction medium, will distinctly influence the reaction toward the formation of the desired solid tetrachlorobutane. Quantities on the order of 1% or 2%, on the same basis, will give excellent yields of the solid modification. Quantities greater than 2% may be used, but will not, in most cases, greatly improve the performance of the process and will generally be found wasteful.

The temperature of the reaction mixture in the process of this invention may be varied from a lower limit, which is the temperature at which the selected reaction medium solidifies, to an upper limit at which decomposition and side reactions occur. When the reaction mass consists to a large extent of suitable chlorination solvents, this lower limit may be as low as is found economic. However, in most cases, it will be cheaper to avoid the use of solvents and to use the reaction products from previous operation as the chlorination medium, in which case it will be necessary to conduct the reaction at temperatures such that the solid modification will not freeze, i. e., at about 72° C. or above. The reaction may be conducted at temperatures as high as 150° C. but it will generally be preferred to operate in the neighborhood of 100° C. or below, since above this temperature side reactions become increasingly dominant.

The chlorine is preferably furnished at the rate of slightly more than 2 mols of chlorine for each mol of butadiene, since otherwise, in the presence of the catalyst, there is a tendency toward the formation of tarry condensation products. This tendency becomes very pronounced if substantially less than 2 mols of chlorine are furnished for each mol of butadiene.

The reaction products formed during the process of this invention mingle with the reaction medium, which may be withdrawn periodically or at the conclusion of operation and processed for the recovery of the tetrachlorobutane. The reaction medium withdrawn from the process will consist of any chlorination solvents originally introduced into the process, the tetrachlorobutanes (largely the solid modification) generated during the process, and minor proportions of miscellaneous other chlorination and degradation products of butadiene. The solvents (if used) and the miscellaneous side-reaction products may be separated from the tetrachlorobutanes by fractional distillation, preferably in a current of steam and/or under vacuum. Such distillation may also be so carried out as to secure a greater or less separation of the liquid and solid tetracholorobutanes. The solid and liquid modifications may also be separated from each other by centrifugation, which will yield a solid tetrachlorobutane of sufficient purity for most purposes. Solid tetrachlorobutane of still higher purity may be prepared by recrystallization of the crude product from suitable solvents.

The process discussed above in general terms is illustrated in specific examples to be given hereinafter. The processes in the examples are carried out in apparatus shown in the accompanying drawing, in which Figure 1 shows an apparatus used in small-scale production of solid tetrachlorobutane according to this invention, and Figure 2 is a sectional view, partially schematic, of a large-scale continuously operating plant for the production of solid tetrachlorobutane in accordance with this invention.

EXAMPLE I

This example was carried out in apparatus shown in Figure 1 as comprising a glass cylinder 1 3½″ in diameter by 15″ in height immersed in an ice-water bath 2. The top of the cylinder is fitted with a ground-jointed glass head 3 through which extend delivery tubes 4 and 5 for chlorine and butadiene respectively. The head 3 is vented at 6 to an absorption train (not shown). The head is provided with a thermometer 7 extending into the cylinder.

A number of runs were made in this apparatus, using various amounts of catalysts (antimony and iron chlorides); various proportions of butadiene and chlorine; and various temperatures as tabulated hereinbelow in the table. In operation, for each run, 500 ml. of carbon tetrachloride were placed in the cylinder 1, together with the selected catalyst. Chlorine and butadiene in proportions approximately calculated to yield tetrachlorobutane were passed in through the delivery tubes 4 and 5, the rate of feed being adjusted to keep the temperature of the reaction mass within the cylinder at a value selected for that run. The run was continued until the volume of reaction mass within the cylinder had increased to 1500 ml., at the end of which time the flow of chlorine and butadiene was discontinued and air was bubbled through the mass by means of the tube 4 to sweep out the unreacted gases. The reaction mass was then distilled, first at atmospheric pressure to remove the carbon tetrachloride, and thereafter under reduced pressure to obtain substantially pure tetrachlorobutanes. The solid modification was isolated from the selected fraction by dissolving in an approximately equal volume of methanol, cooling the solution by means of dry ice, and filtering to recover the crystallized solid tetrachlorobutane. The kind and amount of catalyst used, the temperature of reaction, and yield of solid tetrachlorobutane in each of the several runs are set forth herewith in the table.

*Table*

| Run | Catalyst | | Temp. | Yield of solid $C_4H_6Cl_4$ | Reactant in excess | Remarks |
|---|---|---|---|---|---|---|
| | Type | Amount (per cent, basis $CCl_4$) | | | | |
| | | | °C | Per cent | | |
| 1 | None | 0.0 | 30 | 46 | butadiene | no tar. |
| 2 | $SbCl_5$ | 2.9 | 30 | 70 | do | tar formed. |
| 3 | do | 2.9 | 30 | 71 | chlorine | no tar. |
| 4 | do | 0.1 | 65 | 59 | do | Do. |
| 5 | do | 2.9 | 75 | 76 | butadiene | tar formed. |
| 6 | do | 2.9 | 65 | 68 | neither | slight tar. |
| 7 | $FeCl_3$ | 0.06 | 30 | 49 | chlorine | no tar. |
| 8 | do | [1]0.1 | 20 | 66 | butadiene | tar formed. |
| 9 | do | [1]1.2 | 50 | 70 | do | Do. |

[1] Not all dissolved.

From the table, it is apparent that, in the absence of a catalyst (run No. 1) the liquid modification of tetrachlorobutane is produced in greater quantities than the solid, even at temperatures as low as 30° C. At the more practical higher temperatures, of course, the yield of solid tetrachlorobutane becomes negligible. By comparison, quantities of catalyst as low as 0.1 (runs Nos. 4 and 8) effect a distinct improvement in yield. Quantities of catalyst on the order of 1-3% (runs Nos. 2, 3, 5, 6 and 9) result in yields of over 70% even at relatively high temperatures, (items Nos. 5 and 6) which are preferred since the solid modification of tetrachlorobutane is molten at these temperatures. Likewise the use of excess chlorine (runs Nos. 3, 4 and 7) is seen to prevent the formation of tar, which otherwise occurs (runs Nos. 2, 5, 8 and 9).

EXAMPLE II

Continuous process

The continuous process of this example was carried out in the apparatus shown in Fig. 2 as comprising a chlorine cylinder 7.1 inverted and connected so as to discharge liquid chlorine into an evaporator 8 from which the chlorine is evaporated and discharged through a regulating valve 9, a flow meter 10 and delivery pipe 11 to the bottom of a reaction vessel 12. Similarly, an inverted cylinder 13 of butadiene is arranged to discharge into a train consisting of an evaporator 14, regulating valve 15, flow meter 16 and delivery pipe 17 extending into the bottom of the reaction vessel 12. The reaction vessel 12 more particularly comprises an elongated vertical cylinder 18 provided with a heating and cooling jacket 19. Intermediate the top and bottom of the cylinder 18 are provided agitating means comprising open centrifugal impellers 20 mounted to rotate with a shaft 21 extending through a stuffing box 22 to a motor 23 and journalled at its lower end in a foot-bearing. Stationary dome-shaped baffles 23.2 are disposed above the impellers 20 and serve to further break up the rising streams of gases. In operation, the cylinder 18 is initially charged with previously prepared tetrachlorobutane which preliminarily is melted by admitting steam into the heating jacket 19. 2% of antimony pentachloride, based on the weight of the tetrachlorobutane, is likewise added. Chlorine and butadiene are introduced through the delivery pipes 11 and 17 and allowed to bubble up through the molten mass. The reaction between the chlorine and butadiene generates additional tetrachlorobutane so that the molten mass eventually overflows from the cylinder 18 through an offtake 24 into a surge tank 25. When the reaction is in progress it will generally be necessary to provide cooling water in the jacket 19. The molten tetrachlorobutane in the vessel 25 is conveyed by a pump 26 and conduit 27 to a steam-distillation still pot 28 whence the tetrachlorobutane is distilled in a current of steam, condensed by means of a cold-water jet condenser 29 and stratified in a decanting tank 30. The tetrachlorobutane, which is the heavier phase, is decanted to a precipitating vessel 32 where the solid modification is frozen by means of cold water introduced at 33, the frozen mass being broken up into granular form by means of an agitator 34. From the precipitator the granular material is dropped to a centrifuge 35 in which it is dewatered and washed free of liquid tetrachlorobutane, the solid tetrachlorobutane being retained on the screen of the centrifuge. In this condition the solid tetrachlorobutane is sufficiently pure for most uses. The yield is usually on the order of 70–75%, based on entering materials.

From the foregoing general description and detailed specific examples it is clear that this invention provides an efficient, easily workable method for the production of tetrachlorobutane. The yields of the solid modification are excellent, and the product is sufficiently pure for most purposes.

What is claimed is:

1. Process for the synthesis of high-melting-point tetrachlorobutane which comprises reacting, at temperatures from 72° C. to 150° C., at least 2 mols of gaseous chlorine and not more than one mol of gaseous butadiene by bubbling said chlorine and butadiene through a liquid chlorination medium consisting largely of molten high-melting-point tetrachlorobutane and containing from 0.1% to 2.0%, based on the weight of medium, of a catalyst selected from the group consisting of antimony pentachloride, ferric chloride, and mixtures thereof.

2. Process for the synthesis of high-melting-point tetrachlorobutane which comprises reacting, at temperatures from 72° C. to 100° C., at least 2 mols of gaseous chlorine and not more than one mol of gaseous butadiene by bubbling said chlorine and butadiene through a liquid chlorination medium consisting largely of molten high-melting-point tetrachlorobutane, and containing from 0.1% to 2.0%, based on the weight of medium, of antimony pentachloride.

3. Process for the synthesis of high-melting-point tetrachlorobutane which comprises reacting, at temperatures from 72° C. to 100° C., at least 2 mols of gaseous chlorine and not more than one mol of gaseous butadiene by bubbling said chlorine and butadiene through a liquid chlorination medium consisting largely of molten high-melting-point tetrachlorobutane, and containing from 0.1 to 2.0%, based on the weight of medium, of ferric chloride.

MILTON R. RADCLIFFE.
CHRIS E. BEST.

REFERENCES CITED

The following references are of record in the file of this patent:

UNITED STATES PATENTS

| Number | Name | Date |
| --- | --- | --- |
| 2,038,593 | Muskat | Apr. 28, 1936 |
| 2,242,084 | Nicodemus et al. | May 13, 1941 |
| 2,318,323 | Mueller-Cunradi et al. | May 4, 1943 |
| 2,350,373 | Soday | June 6, 1944 |
| 2,369,117 | Carter | Feb. 13, 1945 |
| 2,374,711 | Soday | May 1, 1945 |

OTHER REFERENCES

Muskat et al., "Hour. Am. Chem. Soc.," vol. 52, page 4053, (1930).

Ser. No. 287,249, Schmidt (A. P. C.), pub. April 29, 1943.